United States Patent [19]

Pietermaat et al.

[11] E Re. 29,998

[45] Reissued May 15, 1979

[54] DEVICE FOR RECORDING IMAGES WITH SIGNAL LEVEL BEING MAINTAINED FOR ONE LINE PERIOD

[75] Inventors: Francois P. Pietermaat, Tervuren; André Peytier, Sint-Joris-Weert; Walter Berckmans, Sint-Katelijne-Waver, all of Belgium

[73] Assignee: AGFA-GEVAERT N.V., Mortsel, Belgium

[21] Appl. No.: 713,885

[22] Filed: Aug. 12, 1976

Related U.S. Patent Documents

Reissue of:

[64] Patent No.: 3,829,608
Issued: Aug. 13, 1974
Appl. No.: 193,928
Filed: Oct. 29, 1971

[30] Foreign Application Priority Data

Oct. 30, 1970 [GB] United Kingdom ..... 51779/70

[51] Int. Cl.[2] ..... H04N 1/22; H04N 1/40; H04N 5/80

[52] U.S. Cl. ..... 358/300; 346/153; 358/127; 358/298

[58] Field of Search ..... 358/300, 296, 298, 127; 346/153, 154, 155, 165

[56] References Cited

U.S. PATENT DOCUMENTS

| | | | |
|---|---|---|---|
| 3,076,968 | 2/1963 | Schwertz | 346/154 |
| 3,091,762 | 5/1963 | Schwertz | 346/154 |
| 3,159,718 | 12/1964 | Richardson | 346/153 |
| 3,220,012 | 11/1965 | Schwertz | 358/300 |
| 3,272,918 | 9/1966 | Koll et al. | 358/287 |
| 3,347,981 | 10/1967 | Kagan et al. | 358/260 |
| 3,417,197 | 12/1968 | Masuda | 358/300 |
| 3,553,718 | 1/1971 | Schierhorst et al. | 346/165 |
| 3,653,065 | 3/1972 | Brown, Jr. | 358/300 |

FOREIGN PATENT DOCUMENTS

| | | | |
|---|---|---|---|
| 880286 | 10/1961 | United Kingdom | 358/300 |
| 882428 | 11/1961 | United Kingdom | 358/300 |

OTHER PUBLICATIONS

Millman et al., Pulse and Digital Circuits, 1956, pp. 339–344 and 415–416.

*Primary Examiner*—Raymond F. Cardillo, Jr.
*Attorney, Agent, or Firm*—William J. Daniel

[57] ABSTRACT

A method of recording an electrostatic charge pattern on an insulating layer. The method comprises the steps of scanning a pattern line-wise to produce an electric signal which is composed of a multiplicity of distinct electric signals determined by successively scanned portions of the pattern. The distinct electrical signals are applied to different places of the insulating layer during a period which is greater than the corresponding period during which the corresponding area of the pattern is being scanned. The charge pattern on the insulating layer is developed in a known way to produce a visible image.

7 Claims, 19 Drawing Figures

12
SYNC.
10
CAMERA
V
13
MULTIPL.
14
REC.ELECTRODES 1
2
3
4
5
625
624

V
t
0,09 µs
52 µs

MEMORIES
130
$22_1$
$22_2$
$22_3$
$22_{600}$
$14_1$
$14_2$
$14_3$
$14_{600}$
23
24
25
21
20
AMPLIF.
V
26
SHIFT REGISTER
27
SHIFT REGISTER
28
SHIFT REGISTER
29
CLOCK

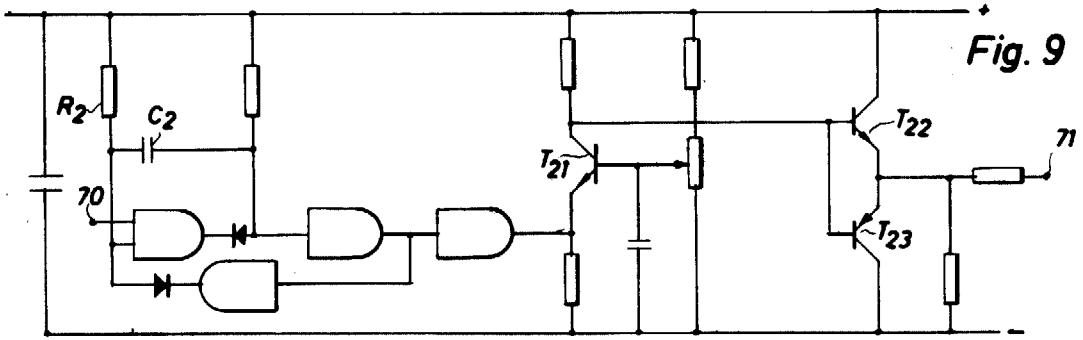
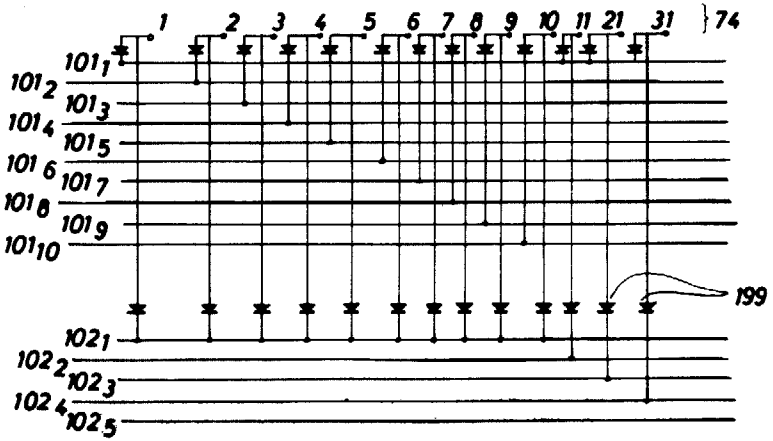
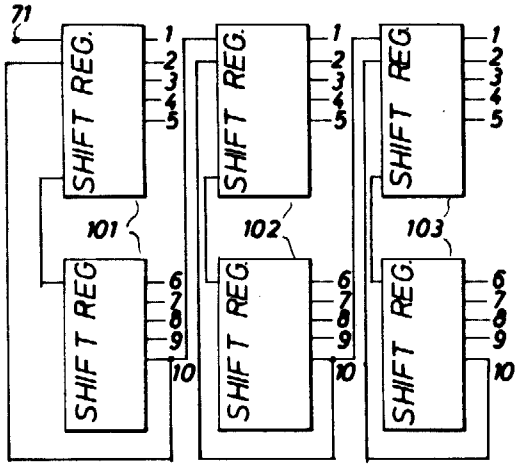
Fig. 10

DEVICE FOR RECORDING IMAGES WITH SIGNAL LEVEL BEING MAINTAINED FOR ONE LINE PERIOD

Matter enclosed in heavy brackets [ ] appears in the original patent but forms no part of this reissue specification; matter printed in italics indicates the additions made by reissue.

The present invention relates to a method and a device for recording a two-dimensional pattern.

More particularly the invention relates to such a method and a device for the direct recording of a pattern which may change as a function of time, by means of an electric signal such as a video signal of a television chain or by means of an output signal of a computer.

It is known to arrange an electrostatic charge pattern in accordance with a television image on an insulating layer by means of a pin-tube. Such a pin-tube may have the form of a usual T.V.-tube in which the fluorescent screen has been omitted and in which e.g. 800 needle-like conductors are melted in one line in the glass front wall so as to protrude at either side thereof. Along these protruding needles a paper web is moved on which an insulating layer has been coated. Charges are applied to the needles by means of the electron beam so that a charge pattern is formed on the paper web. This charge pattern is then developed in conventional ways and with means known in the art.

This pin-tube suffers from the drawback that the needles protruding out of the glass front wall are wearing out by friction on the paper so that the pin-tube must be replaced after a certain working period.

Moreover, such pin-tube shows the conventional drawbacks of vacuum tubes on account of which the lifetime of such pin-tube is limited too.

The object of the present invention aims at neutralizing said disadvantages.

According to the present invention, the method of recording a two-dimensional pattern which may change as a function of time comprises the steps of:

a. analyzing the image according to two directions, preferably normal to each other, to produce an electric signal which, as a function of time, is composed of a multiplicity of distinct electric signals determined by distinct portions of the image,
b. temporarily storing said distinct electric signals during a time which is at least equal to the time required for analyzing the image in one direction, and
c. applying quanta of electrical energy depending on said stored distinct signals to an array of signal-tracing members extending crosswise of a recording material under conditions such as to create on or in said material a record of said image.

The invention is primarily intended for recording patterns of visible light conveying information, e.g., light patterns determined by graphic originals, such patterns being recorded by the recited steps as a visible image or as a latent image which can be used to produce a visible image by a suitable development step or steps. The term "pattern" further denotes symbols such as letters, figures or symbols used in the printing of computer information.

The distinct stored signals are preferably signals each of which is an increment of a signal determined by one scanned line of the original pattern. Thus it is preferable to divide each line signal into a multiplicity of distinct signals for storage.

The quanta of electrical energy applied for affecting the recording material may be voltages which cause electrostatic charges to be laid down on or induced in an electrostatic recording material. Other types of energy may be used with other types of recording material. Thus in suitable cases the said quanta of electrical energy may be electric currents.

The invention as represented by a preferred embodiment thereof can be defined as a method for recording an image comprising the steps of:

a. producing an electric image signal,
b. converting said signal into a multiplicity of distinct electric signals as a function of time,
c. temporarily storing said distinct electric signals,
d. applying electric voltages during a time period in conformity with said distinct electric signals to a plurality of electrodes which are spaced from each other in a direction which is normal to the direction of movement of an electrostatic recording material,
e. removing the distinct voltages from said electrodes,
f. advancing the recording material during the application of said voltages,
g. repeating the successive steps from (b) to (f) until an electrostatic charge image has been formed on the recording material, and
h. developing said electrostatic charge image.

A device for recording a pattern according to the present invention comprises:

a. a scanner for scanning said image line-wise so as to produce an electric image signal which is composed of a plurality of line signals,
b. a recording member which is composed of a plurality of separate signal tracing electrodes which are spaced from each other in a direction which is normal to the direction of movement of a recording material,
c. means for transporting a recording material which is capable of being electrostatically charged along said electrodes,
d. a plurality of electric storage and associated amplifier circuits, the output of each amplifier circuit being connected to one signal tracing electrode so that the potential of such electrode may be raised to a value, at which electrostatic charges may be deposited on the recording material,
e. a plurality of gate circuits which control the connection of a said line signal to said electric storage circuits,
f. means for closing said gate circuits in timed relation with a said line signal,
g. means for removing the stored electric signals from the storage means at the latest at the end of one image cycle,
h. means which is responsive to the sequence of the line signals so as to control the recording of each successive line of the image,
i. means for developing the electrostatic image formed on the recording material.

Preferred embodiments of the device are as follows.

The signal tracing electrodes are in the form of needle-like conductors, the extremities of which facing the recording material are arranged on a line. The said signal tracing electrodes mechanically contact the recording material. There is provided a backing electrode which runs parallel to the recording member at the rear side of the recording material, and which is connected to a potential the polarity of which is opposite to that of the signal tracing electrodes of the recording member.

The invention will be described hereinafter by way of some embodiments with reference to the accompanying drawings. Said embodiments being compatible with the European television standard wherein the frame frequency amounts to 50 Hz with 625 lines per image. The line frequency is 15,625 Hz and interlining is applied.

FIG. 9 represents a circuit of a clock.

FIG. 10 represents a shift register.

FIG. 11 represents a part of a diode matrix.

Figures 1, 2, 3, 4:
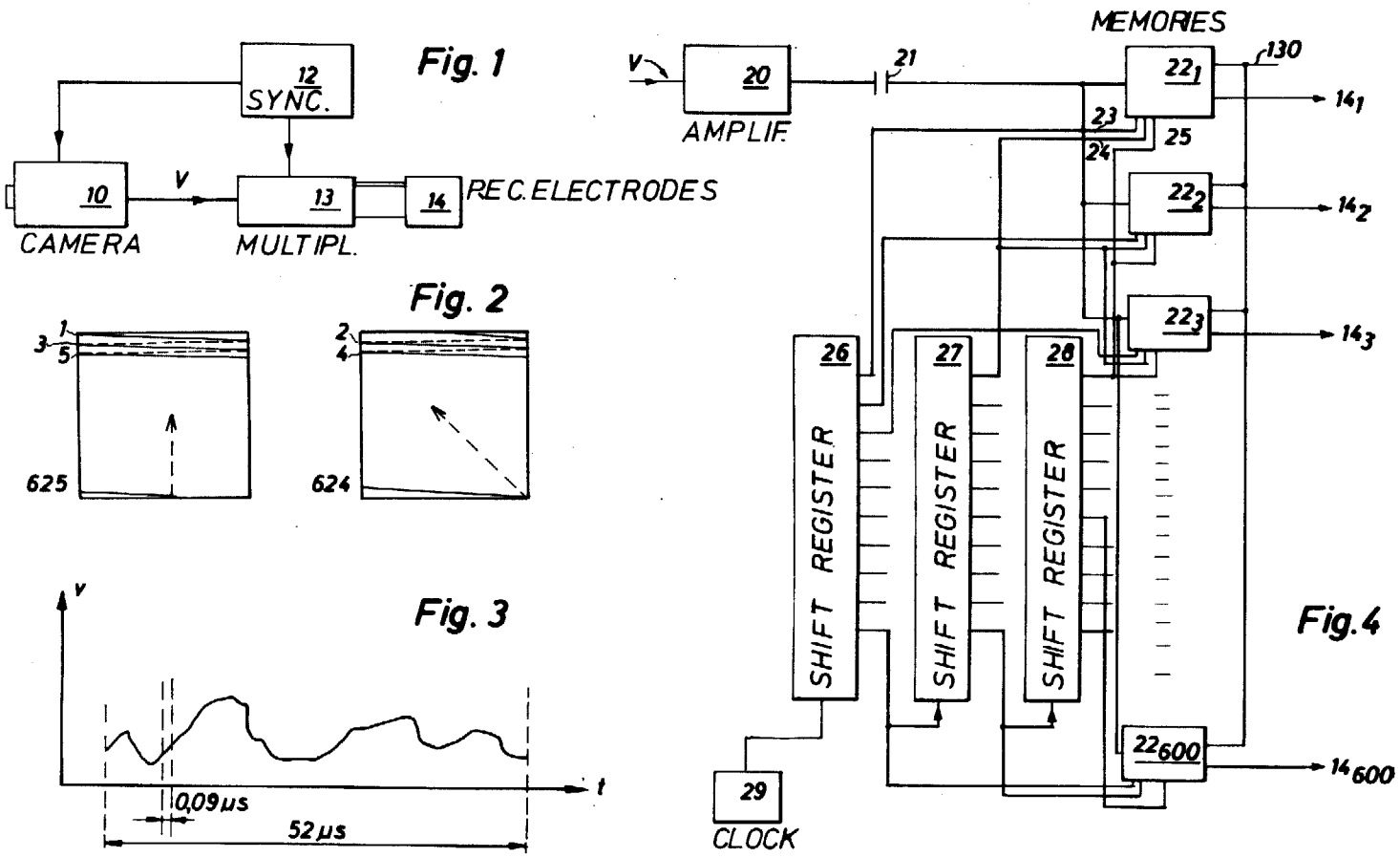
FIG. 1 is a block diagram of an embodiment according to the invention.
FIG. 2 is a line diagram of a usual European T.V. standard.
FIG. 3 shows a video signal corresponding to a line of the diagram according to FIG. 2.
FIG. 4 represents a diagram of a multiplexer according to FIG. 1.

The operation of the arrangement represented by the block diagram of FIG. 1 occurs in the following way. The video signal V produced by a camera 10 is fed to a multiplexer 13 where each line signal is divided into e.g. 600 discrete signals. The camera 10 and the multiplexer 13 are controlled by a synchroniser 12. The 600 output signals of the multiplexer 13 are fed to 600 signal tracing recording electrodes 14 which are arranged on one line crosswise over the path of an insulating recording paper 61. The recording electrodes 14 transfer image-wise charges on the paper and a charge pattern corresponding to the luminosity pattern of an image recorded by the camera 10 is formed in the paper whereupon the charge pattern may be made visible by means of an appropriate toner.

In FIG. 2 is illustrated how the luminosity pattern of the image field is scanned by the camera 10. During the first 20 ms the odd lines are scanned. This first frame thus comprises 312,5 lines. The second frame contains the even lines comprised between the first set of lines. Full information is received after 40 ms. This principle of interlining is practised for limiting the band width of the amplification system and for imparting an impression of a 50 Hz image to a spectator.

The interlining of the T.V.-image causes some difficulties in recording the image on paper. For neutralizing these difficulties, one may suffice in recording of only one frame. However, half the information is lost then. In the embodiment according to FIG. 1 such solution is practised, and thus a camera without interlining may be used. In the latter case the device is not suited for the direct recording of images by means of a usual T.V.-receiver.

In FIG. 3 a video-signal is shown corresponding with one line. According to the invention this signal is divided into e.g. 600 parts. As a line lasts about 52 μs (64 μs - 18 percent at the 625 lines standard, the period of the 600 divisional signals lasts about 0.09 μs each time.

Every 0.09 μs an electronic sample must be taken from the video-signal and conveyed to the right recording electrode. The voltage in this electrode must be proportional to the video voltage but, moreover, must be sufficiently high to obtain a proper density of the developed image. A voltage of the electrodes ranging from 250 to 350 V may be used as a level corresponding to maximum density.

The recording time must be longer than 0.09 μs. In this short time too little charge can be brought on the paper. Therefore one must dispose of a number of memories which store the sampled video-voltage during some time.

FIG. 4 shows a block diagram of the multiplexer 13 according to FIG. 1. The video-signal V is applied to an input of an amplifier 20 and is amplified to a peak-to-peak voltage of e.g. 6 V. The amplifier 20 has a low output impedance in the order of magnitude of some ohms. In adjusting the amplification of the amplifier 20 the image contrast may be modified.

Over a capacitor 21 the alternating current component of the video-signal V is fed to 600 elements 22 (ranging from 1 to 600 and representing the order of the elements 22). The average luminosity is determined by adjusting the direct voltage at the input of the elements $22_i$. Each element $22_i$ comprises a memory which is charged to the instant value of the video voltage if a logical 1 is applied to the inputs 23, 24 and 25 of each element. These inputs are connected to corresponding outputs of three shift registers 26, 27 and 28 having each 10 outputs.

The shift register 26 is controlled by a clock 29 which produces pulses of almost 0.09 μs at about 11 MHz. At each pulse the logical 1 is moving up in the shift register 26 by one output position. The tenth output signal of the shift register 26 produces a control pulse for the shift register 27. In this way 600 combinations can be made to open successively the elements $22_1$ to $22_{600}$ by three pulses during 0.09 μs (400 further possibilities remaining unemployed). At the beginning of each line the shift registers 26, 27 and 28 must be reset to the zero-position. Further the memories of the elements $22_i$ must be brought into the rest position prior to the charging to the instant value of the video-voltage, e.g. by means of a conventional reset signal.

Figure 5:
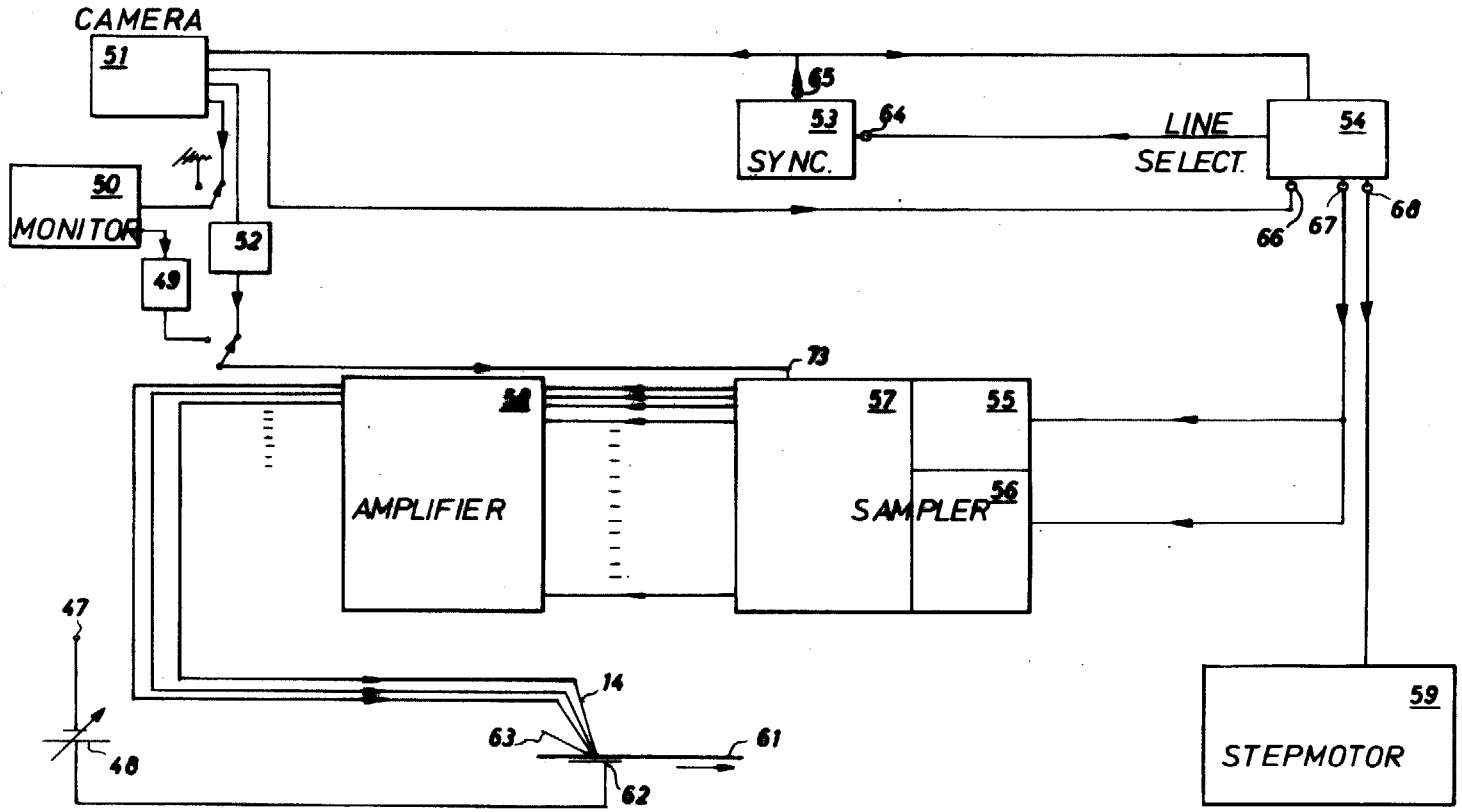
FIG. 5 is a block diagram of a second embodiment of the invention.

Whereas FIG. 4 shows a simplified embodiment of the invention, FIG. 5 shows a more complete block diagram of the invention, since in this embodiment of the invention the delayed recording of the image is applied. In the first frame the first line thereof is recorded, then during about 20 ms the second line of the second frame is recorded and thereafter the third line of the first frame of the next image is recorded during about 20 ms, etc. (see FIG. 2). So each time a next line of a successive frame is recorded. In this way the recording of 625 lines lasts about 12.5 s.

The camera 51 comprises a free running oscillator which constitutes the control unit for a synchroniser 53. At the one hand the recorded image is fed to a monitor 50 and made visible, and on the other hand said image is fed to a video amplifier 52 where the polarity and the output voltage are brought to the appropriate value. A line selector 54 receives the line synchronising pulses at 15,625 Hz, passes them to the synchroniser 53 and converts them into periodic pulses which control a sampler (55, 56 and 57). The synchroniser 53 produces output pulses at 50 Hz which control the vertical deflection unit in the camera 51 and generate the starting pulse for a paper transporting member 59 in the line selector 54.

The sampler 55 comprises a 11 MHz clock oscillator which is periodically started by the line selector 54. The clock pulses control a combination of shift registers and diode matrix. The output signals thereof successively open the gates which take samples of the video signal and store them in separate memories. These voltages are amplified in the amplifier 58 and fed to the recording electrodes 14. At the other side of the paper strip 61 opposite to the recording electrodes 14 a backing electrode 62 is disposed which is connected to a source of potential at terminal 47.

Depending on the toner used the recording voltage of the recording electrodes 14 must have a negative or a positive polarity. If, for instance, the polarity of the electrodes is negative, the backing electrode 62 is connected to the plus line of a supply source. Furthermore, it may be desirable on account of non-linear density-voltage curves, to apply an adjustable bias voltage to the backing electrode 62. This may be done by connecting the backing electrode 62 over an adjustable direct voltage source 48 to a fixed potential at terminal 47.

In the block diagram of FIG. 5 also a connection is provided between the monitor 50 and the sampler (55, 56 and 57) over a reducer 49 in order to record statical T.V. images, such as a test image. The function of the difference blocks will be made clear by the description of the separate blocks following hereinafter.

The amplifier 52 is a conventional amplifier and therefore it will not be described further. The synchroniser 53 receives signals from the 15,625 Hz oscillator through the line selector 54. For permitting a good interlining and for making the line selector 54 to operate properly, the line oscillating frequency and the frame frequency are coupled to each other.

The step motor 59 is controlled by the synchronising pulses. The step motor 59 drives the paper transport rolls, which move a recording paper web 61 along the recording electrodes 14.

Figure 6:
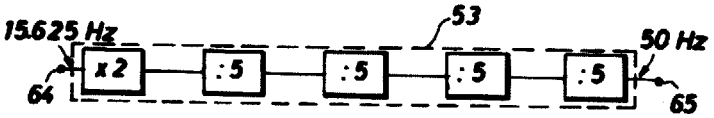
FIG. 6 is a block diagram for exciting a 50 Hz signal by means of a 15,625 Hz-signal.

In FIG. 6 a diagram is represented for obtaining a 50 Hz signal from the 15,625 Hz signal of terminal 64. This latter frequency has been doubled to 31,250 Hz and then divided each time by 5 by means of four successive dividers so that a resulting 50 Hz signal is obtained at terminal 65. In this way one depends on the stability of the 15,625 oscillator so that the resulting frequency never amounts to 50 Hz exactly and will fluctuate slightly. This does not mean a disadvantage for the device according to the invention provided the deviation remains sufficiently low.

The line selector 54 (see FIG. 7) has the function described hereinafter. In view of a delayed recording, starting from a normal line system, it is necessary to perform a line selection. From the first frame, the first line is recorded, from the second frame also the first line is recorded, i.e. in fact the second line of a correctly interlined 625 line image, etc. This selection forms the main function of the line selector 54. The line selector produces a 64 μs pulse at its output each time a definite line may be recorded. The line pulses originating from the camera 51 are converted in the line selector 54 to constitute pulses with appropriate dimensions. Finally a pulse is generated in this selector which coincides with a frame pulse and which indicates that the 625th line has been written so that occasionally a new recording may start. Said functions will be described more in detail hereinafter.

The entering negative line pulses at terminal 66 from the camera 51 are first divided by means of the resistances $R_1$ and $R_2$ (FIG. 7) and fed to a double emittor follower ($T_1$–$T_2$). In this way a too great charging of the camera is prevented. The pulses after the emittor follower have an amplitude which is about equal to the feed voltage. The pulses are reversed in sign by ($T_3$) and fed to an emittor follower ($T_4$) so that positive pulses of about 5 V are available through a lowohmic output terminal 64, and these pulses are precisely used in the block 53.

Figure 8:
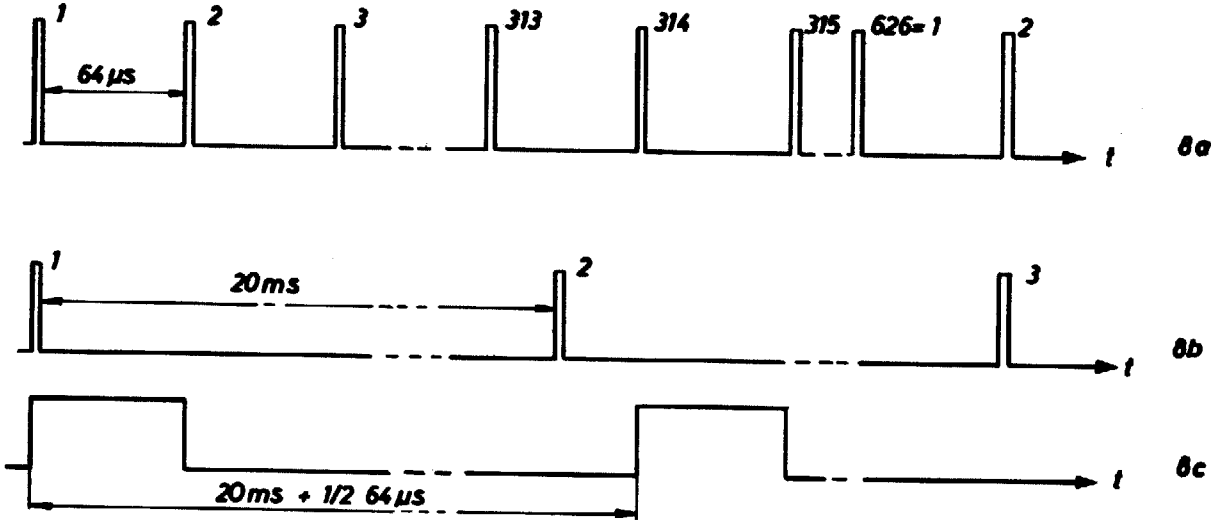
FIG. 8 shows a graph to elucidate the working of the circuit of FIG. 7.

The signal which is treated by unit 54 in FIG. 5 is shown in FIG. 8. FIG. 8a represents the line synchronising pulses 66, FIG. 8b the frame pulses and FIG. 8c the selection pulses 67. It may be seen that the time period between two successive selection pulses remains constant and is equal to 312 lines. During each selection pulse a line will be sampled from the video-signal and fed to a series of capacitors (see further block 57, FIG. 12).

Figure 7:
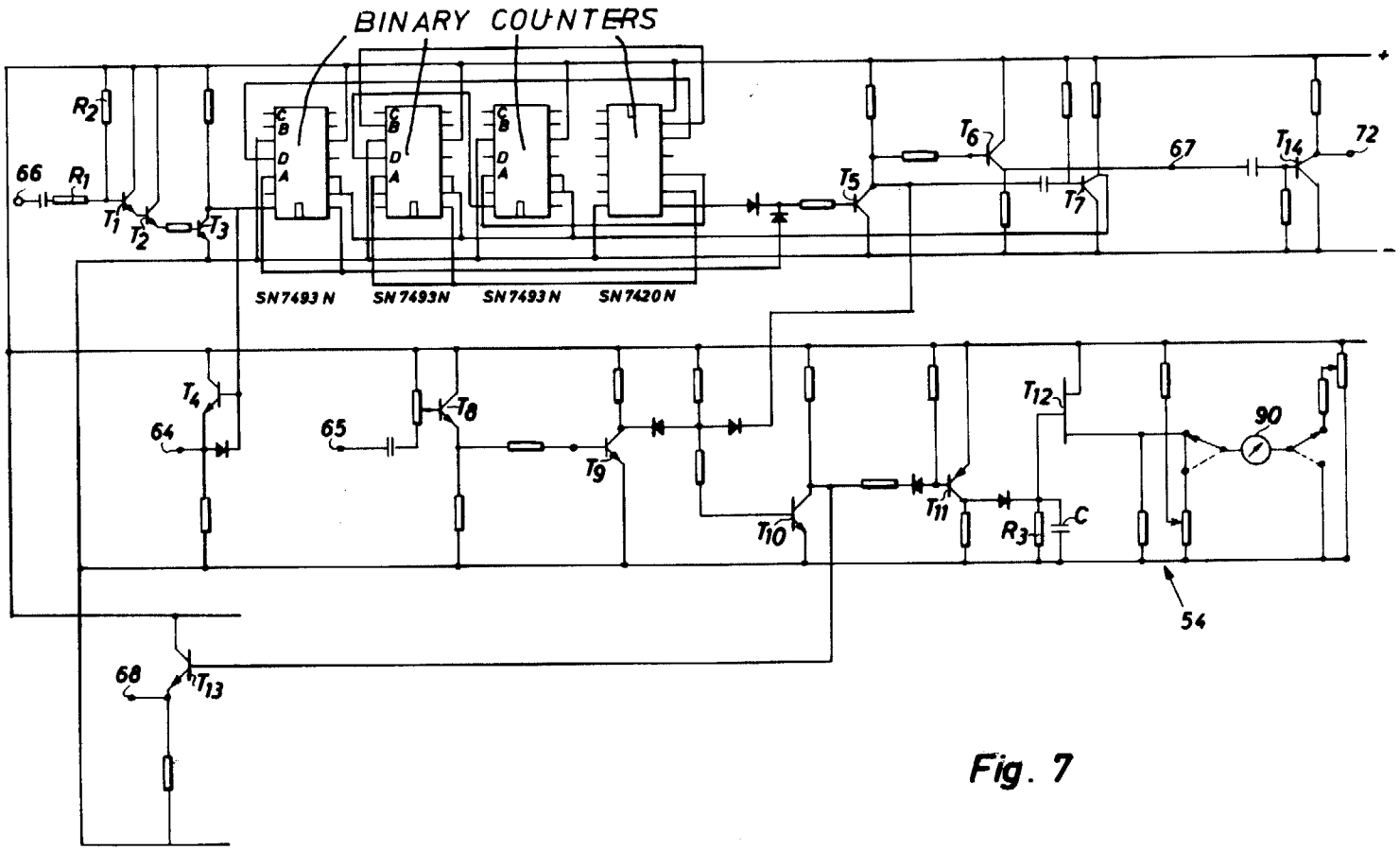
FIG. 7 represents a circuit of a line selector of the circuit according to FIG. 5.

The circuit according to FIG. 7 comprises further three binary counters of four bits each, e.g. of the type SN 7493 N, positioned in cascade. Nine bits in total are used thereof. The first counter is controlled by the line synchronising pulses at terminal 66. After 312 pulses the position of the nine flip-flop outputs is as follows: 100111000 what corresponds with the binary representation of the number 312. The four outputs which have now the value of 1 are fed to an NAND-gate (SN 7420 N) the output voltage of which thus becomes 0 at the moment of the 312th pulse. This output is connected with an OR-gate together with the first flip-flop output A. Immediately after the 312th pulse both inputs of this OR-gate become 0, and so does the output. A transistor in common emitter circuit ($T_5$) follows then, said transistor having consequently a logical 1 at its output. This logical 1 is fed to an emitter follower ($T_6$) and constitutes the output signal at terminal 67. At the 313th pulse the output A of the first flip-flop circuit becomes 1, the OR-output becomes equally 1 and the output at 67 becomes 0 again. This negative step is differentiated, reversed in polarity ($T_7$) and used for resetting all counters to 0 (RESET). The whole cycle may start again thereafter.

As to the starting pulse for a new recording reference is made to FIG. 7. The negative frame synchronising pulses at about 50 Hz, originating from the output 65 of the block 53 are attenuated and fed to an emittor follower ($T_8$). Their signs are reversed by ($T_9$) and they are fed to an AND-gate together with the pulses produced at the output of $T_5$.

This AND-gate produces positive pulses at its output each time there is a coincidence between a frame pulse and a line selection pulse: this points indeed to the beginning of a new image. Since the width of a frame pulse occupies the width of several line periods, a few coincidences will arise one after another but this does not disturb, however, the further operation. The positive pulse is amplified by a common emittor circuit ($T_{10}$) and then after a common collector circuit ($T_{13}$) delivered as a starting pulse to the remaining part of the circuit at output 68.

In the diagram according to FIG. 7 further a measuring instrument 90 is represented which allows to set the time between two starting pulses at 68, or in other words, to control the recording time.

Negative starting pulses may be used to charge the capacitor C through an amplifier ($T_{11}$). Thereupon this capacitor will discharge through a resistance $R_3$ with a $\tau$ of about 18 s. This discharging and the resetting are made visible on a measuring instrument 90 through a FET-Source-follower ($T_{12}$). The scale of this measuring instrument may be gauged in seconds. A correct image-reproduction requres $625 \times 20$ ms $= 12.5$ s. The measuring instrument 90 can further act as a volt meter for checking the feed voltage.

A coupling between line frequency and frame frequency is almost required. Indeed, if the line frequency is by one-sixth percent too low, then the fault in time between two line pulses amounts to about 0.1 $\mu$s. This means a fault of about 30 $\mu$s for 300 pulses which in the case of the arrangement of FIG. 8 means that two successive selection pulses almost coincide with two successive frame pulses: this situation is but very slow in evolution. The time between two coincidence pulse groups becomes very great.

If, on the contrary, the line frequency is by one-sixth percent too high then the shifting between a selection pulse and a frame pulse will go on too fast. The times between two successive coincidence pulses become much shorter than the correct image reproduction of 12.5 s (about the half thereof).

Since the speed of the paper web in the printing apparatus is constant, the recording time is fixed and thus the circuit according to FIG. 6 for coupling line with frame frequency is indispensable.

The clock 55 (FIG. 9) serves the purpose of taking samples in one line. Since one line lasts 65 $\mu$s of which still a part must be used for the resetting and since a horizontal resolving power of 600 points is desired, then the clock frequency must amount to about 11 MHz. This frequency can be adjusted by varying the time constant of the circuit $R_2C_2$ in FIG. 9. Small values of $R_2$ increase, however, the current to be delivered by the feeding source. For the four NAND-gates use can be made of an integrated circuit e.g. of the SN 7400 N type. The output signal of the fourth NAND-gate is still rather sinusoidal. The transistor ($T_{21}$) cuts off this sine curve and only amplifies the peaks. The complementary emittor follower ($T_{22}$) ($T_{23}$) triggers a high current and delivers a very low output impedance. This clock shows the advantages of a very compact arrangement, a smooth frequency adjustment, it is self-starting and can be started synchronously by a gate pulse at input 70.

The shift register is illustrated in FIG. 10. The circuit comprises six shift registers with five outputs (SN 7496 N). The first two shift registers constitute a ring counter at 11 MHz with 10 outputs. The tenth output acts as a clock for the second ring counter with ten outputs operating at 1.1 MHz.

The third ring counter operates at 110 kHz. With the three groups of 10 outputs it may be possible to obtain $10^3$ outputs in a diode matrix, said outputs producing one after the other a logical 1 during 0.09 $\mu$s.

At the start of each new line to be recorded all shift register outputs are brought to zero. This is done by a clear pulse. This pulse is obtained as follows. A line-out pulse originating from point 67 of the line selector (FIG. 7), is differentiated, amplified and reversed in polarity (in $T_{14}$). The resulting clear pulse at terminal 72 coincides with the start of the line out pulse at 67. As soon as the 600th output shows a logical 1 i.e. when the outputs $\mathbf{103}_6$, $\mathbf{102}_{10}$ and $\mathbf{101}_{10}$ show a logical 1, then the supply of clock pulses must be stopped. For this purpose the outputs $\mathbf{103}_6$, $\mathbf{102}_{10}$ and $\mathbf{101}_{10}$ are connected to an AND-gate the output signal of which short-circuits the clock pulses when it becomes 1. Further all shift register outputs can be connected to an emittor-follower to increase their charge capacity.

FIG. 11 is an example of a matrix of $10 \times 5$ diodes 199 which make it possible to obtain 50 outputs. These outputs are obtained with AND-gates connected in the $10 \times 5$ matrix.

Figure 12:
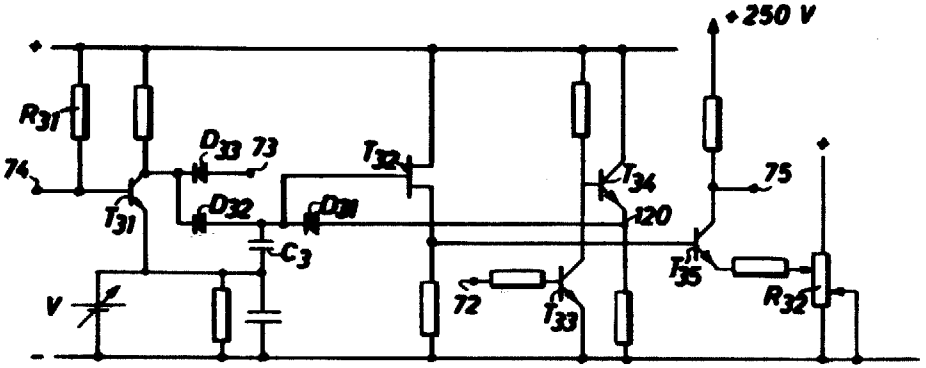
FIG. 12 represents a memory and amplification circuit.

The circuit with the memory and the final amplifier (power amplifier) for each separate recording electrode is represented in FIG. 12. The memory function is effected by a capacitor $C_3$. At the beginnng of a new line the memory is reset. This is done by making the voltage over the capacitor $C_3$ almost equal to the feed voltage. This resetting operation is effected by means of transistors ($T_{33}$) and ($T_{34}$). Transistor ($T_{33}$) receives a clear pulse at input terminal 72, amplifies this pulse and reverses the sign thereof. Through an emittor-follower ($T_{34}$) the clear line 120 is fed. A short positive pulse charges the capacitor $C_3$ and after the clear pulse has ended diode ($D_{31}$) is blocking, so that capacitor $C_3$ does not loose its charge which remains constant until the information has been recorded.

The information is recorded as follows. In the rest position ($T_{31}$) is blocked. Its basis is connected via $R_{31}$ with the feed voltage and is connected with an output $\mathbf{74}_i$ of the diode matrix (see FIG. 11). When the corresponding AND-gate of the matrix according to FIG. 11 is opened, the corresponding transistor ($T_{31}$) of FIG. 12 will become conducting. Thereby the capacitor ($C_3$) will discharge over ($D_{32}$) through ($T_{31}$). The collector voltage, however, will only drop to a level corresponding to the instant value of the video voltage at 73, except for the diode voltage over ($D_{33}$). When the output signal $\mathbf{74}_i$ of the corresponding AND-gate has ended then ($T_{31}$) will be blocking again so that its collector voltage is increasing and ($D_{32}$) and ($D_{33}$) are blocking. In this way the memory $C_3$ is charged to the instant value of the video voltage.

The adjustable voltage represented in FIG. 12 serves the purpose for securing that ($T_{31}$) is blocked in the rest position.

The voltage on the capacitor $C_3$ is further used for performing the recording. This recording as such consumes almost no charge but requires high voltages, so that the voltage over the capacitor ($C_3$) must be amplified. This amplifier must have a high input impedance. To suit this purpose use is made of a field effect transistor ($T_{32}$).

The final amplifier ($T_{35}$) serves the purpose to amplify the recording voltage to about 250 V, while reversing the sign. The potentiometer $R_{32}$ having two sliders is used for adjusting the luminosity and for compensating an occasional spreading in the characteristics of ($T_{32}$). The output 75 of the amplifier is connected to a recording electrode 14. In this way a continuous tone print can be obtained from a stationary T.V.-image.

It is however also possible to omit the continuous grey tone and to produce a line print. It suffices therefore to connect a Schmitt-trigger (see FIG. 13) to the video-output 73. For this purpose the analog video signal is converted into a digital signal with two levels corresponding with the input voltages under or above the trigger level, which is self-adjusting. The use of a digital signal presents the advantage that the memory circuit may also be made digital, and that the noise suppression is better.

Figure 13:
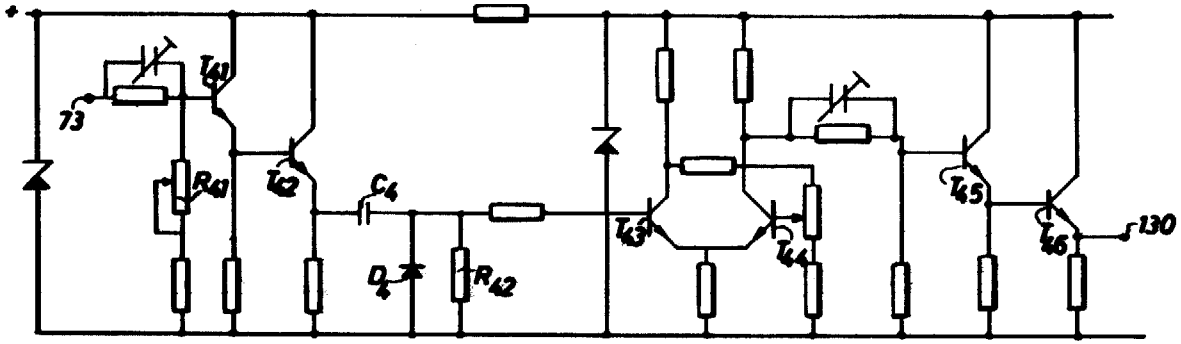
FIG. 13 represents a Schmitt-trigger arrangement.

In FIG. 13 $R_{41}$ enables an adjustable reduction of the video signal according to the image content.

The circuit $R_{42}$–$C_4$–$D_4$ serves the purpose to fix the lower values of the video signal at a level of about 0 volts. $R_{42}$ adjusts the trigger level of the Schmitt trigger formed by ($T_{43}$) and ($T_{44}$). A double emittor follower ($T_{45}$) ($T_{46}$) provides for a low output impedance. The digital output signal is available at the output terminal 130. Instead of a Schmitt-trigger according to FIG. 13, also an over-driven amplifier for obtaining a digital output signal may be used.

Figure 14:
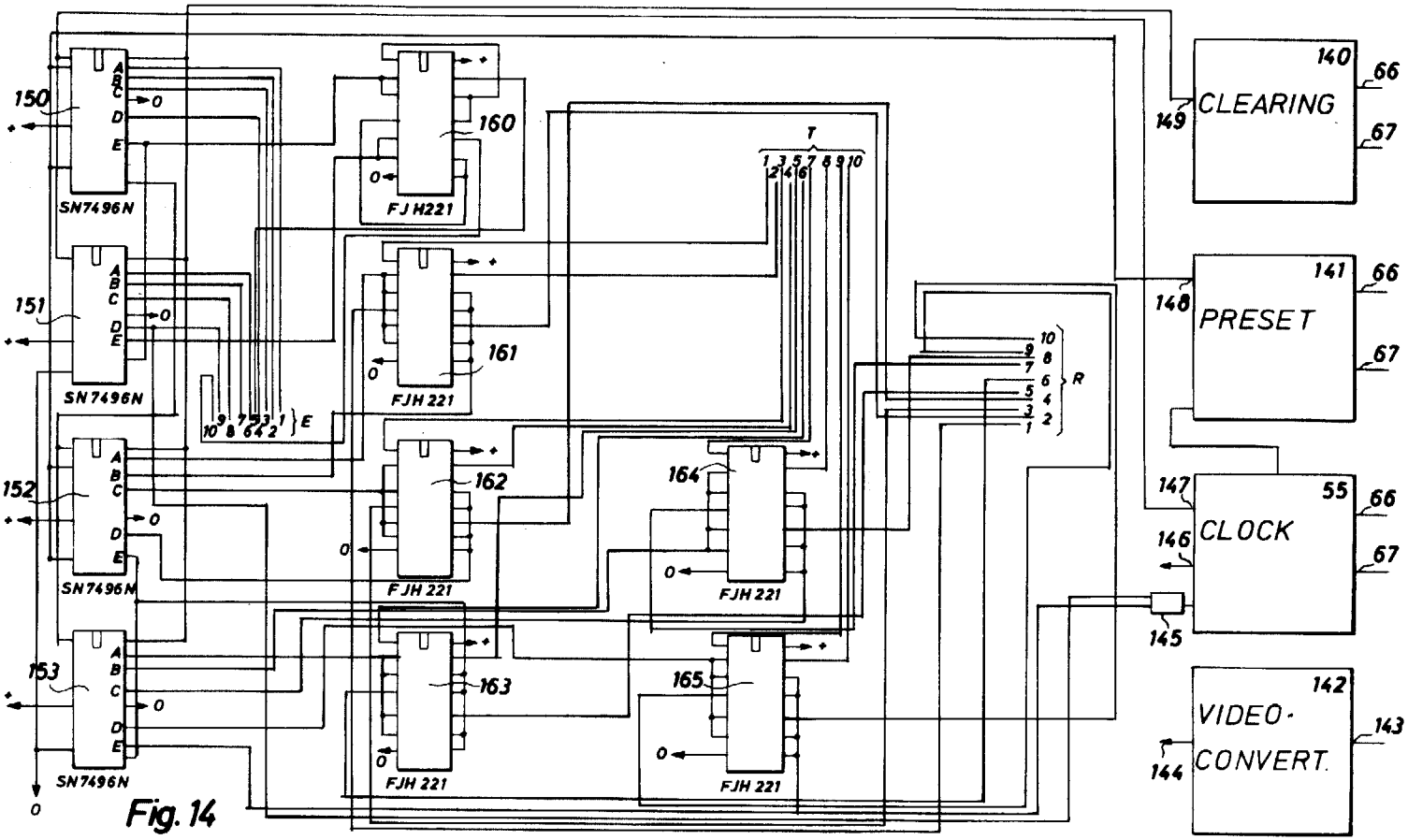
FIG. 14 shows a block diagram of a third embodiment of the invention.
Figure 15:
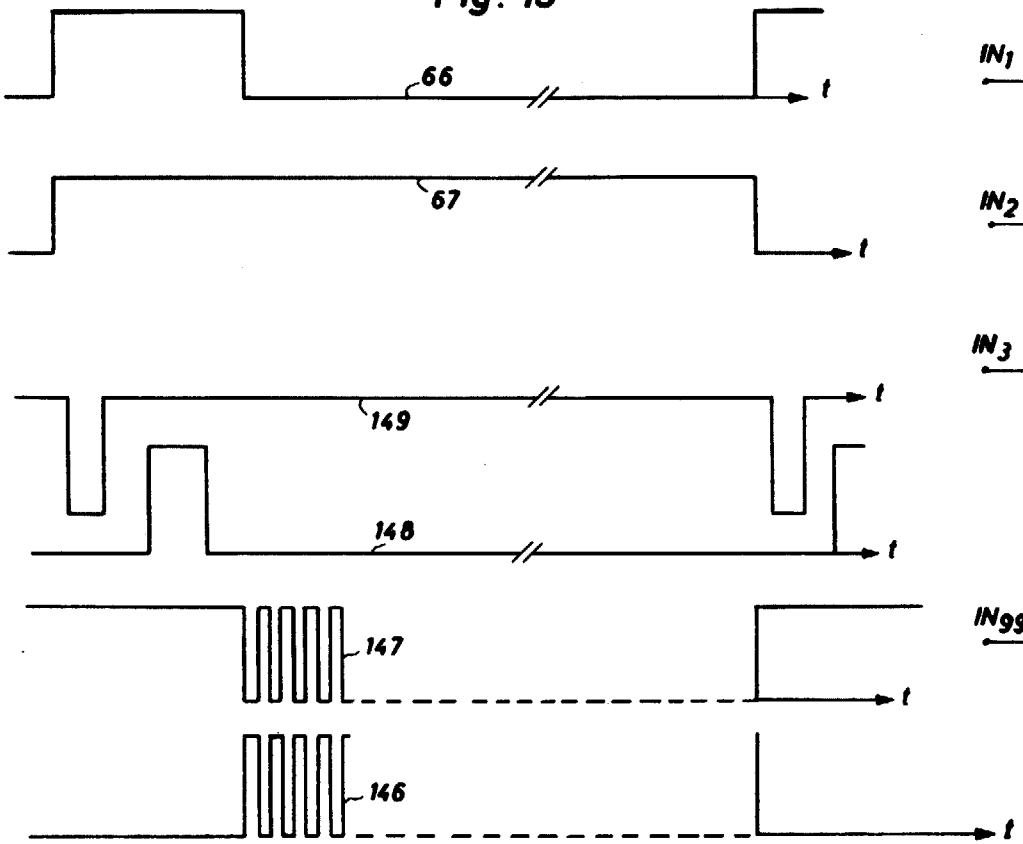
FIG. 15 shows graphs for elucidating the operation of the circuit according to FIG. 14.

With reference to FIGS. 14 and 15 a device of a full digitally operating embodiment of the invention will be described. This digital device has the advantage to be simpler, compacter and more reliable than the device described hereinbefore. FIG. 14 illustrates a block diagram for 100 recording electrodes. In a simple way this circuit can be extended to 600 or more recording electrodes.

By means of the arrangement according to FIG. 14 a device may be constructed which is capable to convert a sequential, binary electrical signal into a corresponding collection of spatially sequential signals which are each capable of controlling recording electrodes for electrostatic recording. To be suited for electrostatic recording the signals must be amplified to a sufficiently high voltage and they must be applied long enough to the electrodes, which is made possible by the memories.

The blocks 140, 141 and 55 illustrate respectively the clearing member, the presetting member and the clock. The input and the output signals of the members are illustrated in FIG. 15 as a function of the time t. The line synchronising pulse 66 and the line-out pulse 67 originating from the line selector 54 have been illustrated in FIG. 8. The output signal 149 of the clearing member lasts about 0.5 to 1.5 μs and starts together with the line-out pulse 67 and serves to reset the shift registers in the zero position at the beginning of a new line to be recorded. The presetting member 141 serves the purpose of resetting all shift registers in an exact starting position prior to starting the clock 55. This is done by the signal 148.

An example of a circuit for the clock 55 has already been described hereinbefore. The clock 55 according to FIG. 14 produces two complementary signals 146 and 147. For controlling the shift registers use is made of the signal 147.

The block 142 represents a video converter and an amplifier which converts the input signal 143 into a digital signal 144 which is fed to the memories.

The memory is formed by flip-flop circuits which also include the matrix circuit. The reset is done by clock pulses prior to storing a new information and it is done in groups of 10. This means that almost during the same time each memory will contain the information even at high recording speeds. For the 100 flip-flop circuits integrated circuits of the FJJ 101 type are used. Their connections are coupled as indicated in the inserted table.

Figure 16:
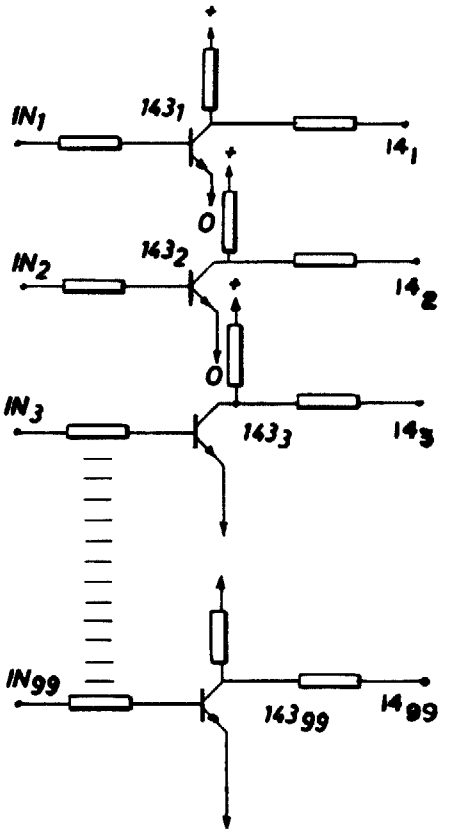
FIG. 16 shows amplification circuits for individual recording electrodes.

The outputs $IN_i$ of the flip-flop circuits are connected to the amplifiers $143_i$ which feed the recording electrodes $14_i$ (FIG. 16).

The function and operation of the four integrated circuits SN 7496 N (150–153) which are illustrated in FIG. 14 are the same as those of the circuit according to FIG. 10. Each output however can only be charged by ten elements of the FJJ 101 type, but the outputs E of the integrated circuits 150 and 151 are charged 11 and 12 times, respectively. Therefore these outputs are connected to the block 160 of the FJH 221 type which comprises 2-input NOR-gates. In connecting two NOR-gates in cascade the sign reversion is avoided and the charge capacity is increased.

The 10 outputs of the shift registers 152 and 153 produce:

1. the pulses T which may be combined with the first group of 10 outputs,
2. the reset pulses for different groups of 10 flip-flop circuits (group R).

This is a too high charging. Therefore the outputs are connected to the five integrated circuits 161 to 165 of the FJH 221 type in which each time two NOR-gates are connected in parallel so that the charge capacity becomes sufficiently high. Thereby also the sign is reversed, but this is of no influence for the present application. As a result thereof a logical 1 is shifted in the shift registers 152 and 153. Indeed, the flip-flop of the FJJ 101 requires a negative transition from 1–0 for the reset. Moreover, this type of flip-flop (called J–K masterslave flip-flop) comprises at its inputs J and K two net works securing the logical functions $J=J_1 \cdot J_2 \cdot J_3$ and $K=K_1 \cdot K_2 \cdot K_3$. If the group of T-outputs is connected to the $J_3$ terminals a sign reversion is also wanted here.

The operation of the device according to FIG. 14 is as follows. The flip-flops the terminals of which are connected as indicated in the table, are brought into the zero position by means of a signal of the group R, some moments before the flip-flop may be made to respond. At the moment that the input signal of the group E which is connected to the input $J_2$ of the appertaining flip-flop, is in the highest position, whereas at the same time the signal of the group T is connected to the input $J_3$ is low and the video signal connected to $J_1$ is high, then the output signal $Q_1$ of the flip-flop will turn to the highest position at the next following clock pulse, which is fed to the input T.

Consequently, the network $J_2$, $J_3$ plays the part of the diode matrix described hereinbefore, whereas the binary video information is fed to the terminal $J_1$. So the matrix has been extended to one feed terminal per gate, wherein the video information is applied at this extra terminal.

Care must be taken in that the inputs $J_2$ and $J_3$ receive the desired signals at the moment the trigger input (T) of the flip-flop receives a clock pulse. One must thus consider the delaying time between a block pulse 147 and the transition moment of the groups E and T. This delaying time is caused by the delayings in the shift registers 150 and 153 and in the gates 160 to 165.

Figure 17:
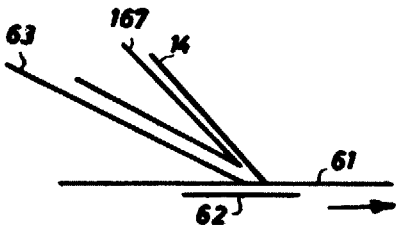
FIG. 17 represents diagrammatically the position of the recording electrodes and the amplification electrode.

FIG. 17 shows a detail of the electrostatic recording member. The electrodes are arranged at an angle in the order of magnitude of 40° to the normal, towards the upstream side of the moving paper 61. Upstream of the electrodes 14 an amplifying electrode 63 is positioned on the paper strip 61 at an angle in the order of magnitude of 20° to the horizontal. Between the pins 14 and the amplifying electrode 63 a wedge 167 of insulating material is arranged. The electrode 63 is connected to a voltage the polarity of which is opposite to that of the voltage on the electrodes 14. The distance between the electrodes 14 and the electrode 63 at the level of the paper strip 61 is in the order of magnitude of 0.1 to 1 mm.

Figure 18:
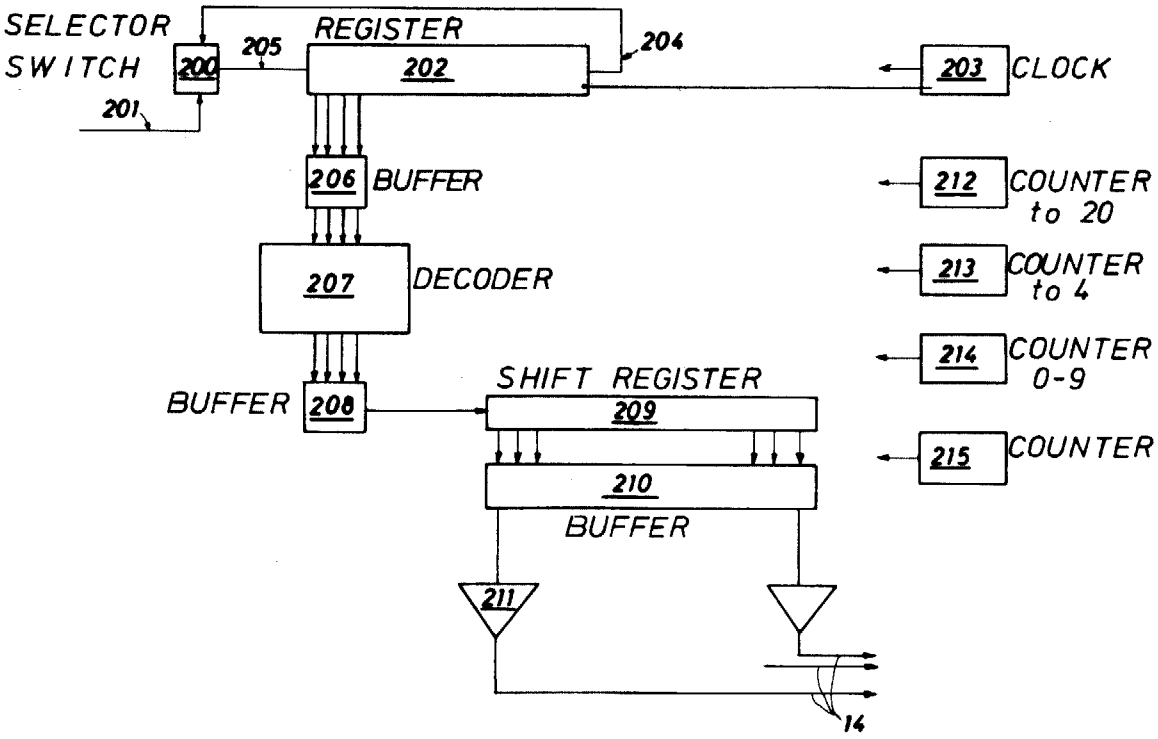
FIG. 18 is an amplified block diagram of an embodiment for recording computer information.

FIG. 18 illustrates a simplified block diagram of a device enabling the display of computer information. As an example thereof the electrographic recording of the digits from 0 to 9 is described. These digits may be displayed by blackening a properly chosen number of dots in a matrix of 4×7 dots. The digits are produced by the computer as 4 bit-words, for instance in the so-called BCD-code. The device according to FIG. 18 converts this code into signals which are passed to the recording electrodes, while the paper continues travelling so that on the non-conductive paper a charge pattern is produced which may be developed by means known per se.

In FIG. 18 the numeral 200 is a selector switch, which either admits the introduction of a computer signal 201 or reconveys information from a 20 bit shift register 202 to the input of this register. A clock 203 controls the passage of the information in the register 202.

The operation of the described device is as follows.

First a series of code words of four bits each is introduced into the register 202 by actuating the switch 200. As soon as the egister 202 has been completely filled, the switch 200 is reversed, so that the output 204 of the register 202 is connected with its input 205. In the present example the code words are constituted by equivalents of the digits 0 to 9.

The register 202 is provided with four further outputs which are directly connected with a four bit buffer register 206. Each time a complete code word arrives at the level of the buffer register 206, it is recorded in this member. The outputs of the buffer 206 are directly connected with a decoding circuit (207) which will be described hereinafter. It is the object of the decoding circuit 207 to convert the code word into a code of 7×4 bits which can be used for actuating the recording electrodes.

The decoding circuit 207 disposes of a time of four clock pulses for recording the decoding signal in a further register 208 whereupon an other code word is recorded into the buffer register 206.

The register 208 passes its information to a series input of a 20 bit shift register 209. 20 parallel outputs of the register 209 are connected with the parallel inputs of a buffer register 210, the outputs of which feed each a voltage amplifier 211, said amplifiers being themselves each connected to a recording electrode 14.

A counter member 212 controls the position of the series of code words in the register [204.] *202.* A counter member 213 controls the position of the separate code words. The member 213 counts as far as 4 and restarts thereupon from 1. Each time said member is positioned on 4 a new code word is situated at the level of the buffer register 206.

A counter member 214 checks the lines of the 7×4 matrix and is controlled by the member 212. Each time the member 212 is located on 20, the counter member 214 increases its position by 1. The counter 214 counts up from 0 to 9, after 9 it returns to 0. When the counter 214 is located at the zero position, then the selector switch 200 is set into the position for recording new information to the register [204.] *202.*

In all other positions, the member 214 allows the information to travel in the register [204.] *202.*

A further counter 215 gives the same outputs as the member 214 but this is done two clock pulses later.

The information is thus passed ten times in the register [204.] *202.* During the first line (output [215] *214*=0) and the two last lines (output [215] *214*=8 and 9) the decoding output remains zero. These lines serve as a space between the digits.

The paper is preferably moved by means of a step motor along the recording electrodes 14. Each step of the step motor then coincides with the changing movement of one of the counters 214 and 215.

The spaces between the digits are made by the recording head itself. The recording electrodes are ranged in groups of four electrodes each.

Figure 19:
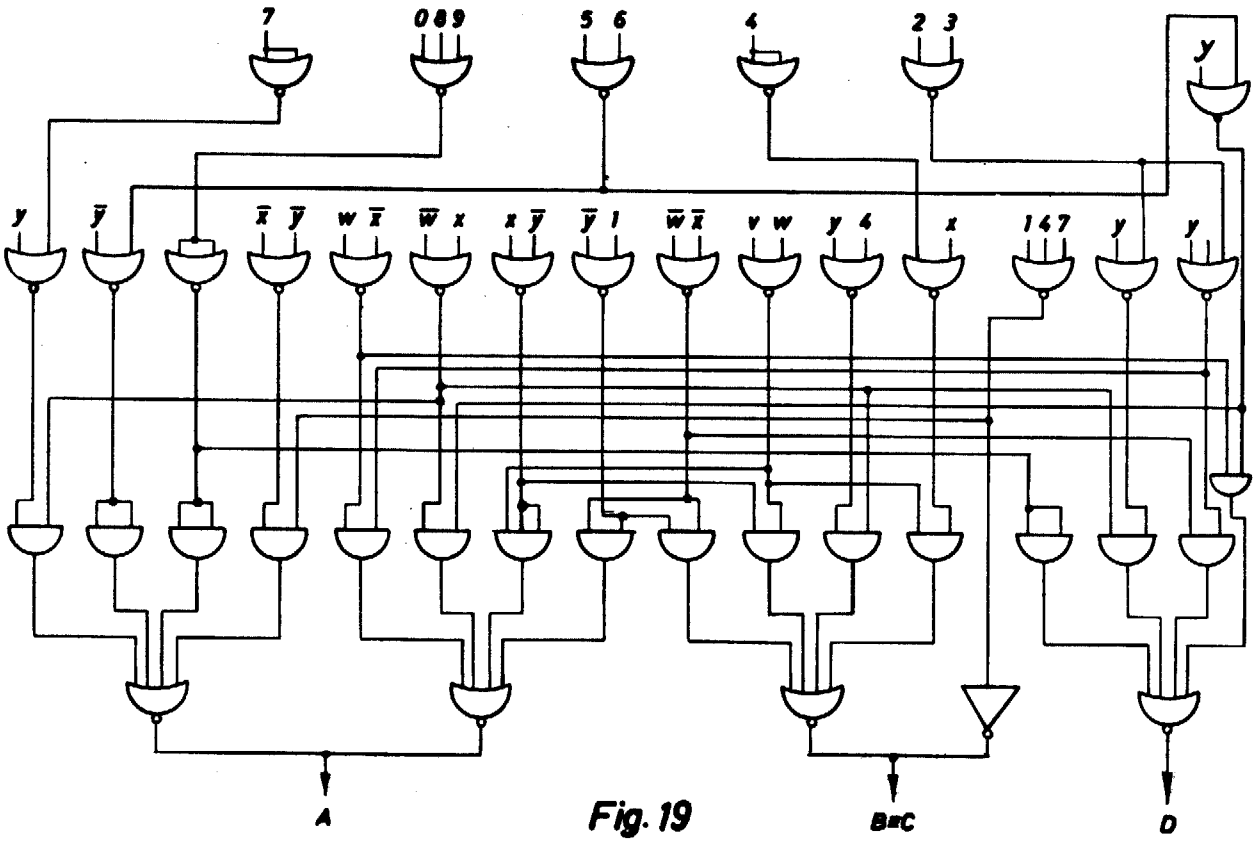
FIG. 19 is the electric circuit of a block diagram of the device according to FIG. 18.

FIG. 19 illustrates a diagram of the decoding [member] *circuit* 207. This [member] *circuit* is mainly constituted with NOR-gates assuring small delay times. According to this figure x, y, v and w represent the four bits of the coded signal, x, y, v, and w represent their inverse values; A, B, C and D represent the output bits and the digits 0 to 9 represent the line selecting signals, i.e., the output signals of the counter 214 which illustrate the position of the latter member.

Of course, it is equally possible to record letters instead of digits with an analogous circuit. In this respect e.g. use may be made of a 7×5 matrix and one may represent all symbols of the alphabet.

TABLE

| Pin | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Function | | $S_2$ | $J_1$ | $J_2$ | $J_3$ | $Q_2$ | $\phi$ | $Q_1$ | $K_1$ | $K_2$ | $K_3$ | T | $S_1$ | P |
| | | | | | | | Flip-Flop No. | | | | | | | |
| 1 | | + | 144 | E1 | | T1 | 0 | IN1 | | 0 | | 146 | 149 | + |
| 2 | | + | 144 | E2 | | T1 | 0 | IN2 | | 0 | | 146 | 149 | + |
| 3 | | + | 144 | E3 | | T1 | 0 | IN3 | | 0 | | 146 | 149 | + |
| 4 | | + | 144 | E4 | | T1 | 0 | IN4 | | 0 | | 146 | 149 | + |
| 5 | | + | 144 | E5 | | T1 | 0 | IN5 | | 0 | | 146 | 149 | + |
| 6 | | + | 144 | E6 | | T1 | 0 | IN6 | | 0 | | 146 | 149 | + |
| 7 | | + | 144 | E7 | | T1 | 0 | IN7 | | 0 | | 146 | 149 | + |
| 8 | | + | 144 | E8 | | T1 | 0 | IN8 | | 0 | | 146 | 149 | + |
| 9 | | + | 144 | E9 | | T1 | 0 | IN9 | | 0 | | 146 | 149 | + |
| 10 | | + | 144 | E10 | | T2 | 0 | IN10 | | 0 | | 146 | 149 | + |
| 11 | | + | 144 | E1 | | T2 | 0 | IN11 | | 0 | | 146 | R2 | + |
| 12 | | + | 144 | E2 | | T2 | 0 | IN12 | | 0 | | 146 | R2 | + |
| 13 | | + | 144 | E3 | | T2 | 0 | IN13 | | 0 | | 146 | R2 | + |

TABLE-continued

| Pin | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Function | | $S_2$ | $J_1$ | $J_2$ | $J_3$ | $Q_2$ | $\phi$ | $Q_1$ | $K_1$ | $K_2$ | $K_3$ | T | $S_1$ | P |
| 14 | | + | 144 | E4 | | T2 | 0 | IN14 | | 0 | | 146 | R2 | + |
| 15 | | + | 144 | E5 | | T2 | 0 | IN15 | | 0 | | 146 | R2 | + |
| 16 | | + | 144 | E6 | | T2 | 0 | IN16 | | 0 | | 146 | R2 | + |
| 17 | | + | 144 | E7 | | T2 | 0 | IN17 | | 0 | | 146 | R2 | + |
| 18 | | + | 144 | E8 | | T2 | 0 | IN18 | | 0 | | 146 | R2 | + |
| 19 | | + | 144 | E9 | | T2 | 0 | IN19 | | 0 | | 146 | R2 | + |
| 20 | | + | 144 | E10 | | T3 | 0 | IN20 | | 0 | | 146 | R2 | + |
| 21 | | + | 144 | E1 | | T3 | 0 | IN21 | | 0 | | 146 | R3 | + |
| 22 | | + | 144 | E2 | | T3 | 0 | IN22 | | 0 | | 146 | R3 | + |
| 23 | | + | 144 | E3 | | T3 | 0 | IN23 | | 0 | | 146 | R3 | + |
| 24 | | + | 144 | E4 | | T3 | 0 | IN24 | | 0 | | 146 | R3 | + |
| 25 | | + | 144 | E5 | | T3 | 0 | IN25 | | 0 | | 146 | R3 | + |
| 26 | | + | 144 | E6 | | T3 | 0 | IN26 | | 0 | | 146 | R3 | + |
| 27 | | + | 144 | E7 | | T3 | 0 | IN27 | | 0 | | 146 | R3 | + |
| 28 | | + | 144 | E8 | | T3 | 0 | IN28 | | 0 | | 146 | R3 | + |
| 29 | | + | 144 | E9 | | T3 | 0 | IN29 | | 0 | | 146 | R3 | + |
| 30 | | + | 144 | E10 | | T4 | 0 | IN30 | | 0 | | 146 | R3 | + |
| 31 | | + | 144 | E1 | | T4 | 0 | IN31 | | 0 | | 146 | R4 | + |
| 32 | | + | 144 | E2 | | T4 | 0 | IN32 | | 0 | | 146 | R4 | + |
| 33 | | + | 144 | E3 | | T4 | 0 | IN33 | | 0 | | 146 | R4 | + |
| 34 | | + | 144 | E4 | | T4 | 0 | IN34 | | 0 | | 146 | R4 | + |
| 35 | | + | 144 | E5 | | T4 | 0 | IN35 | | 0 | | 146 | R4 | + |
| 36 | | + | 144 | E6 | | T4 | 0 | IN36 | | 0 | | 146 | R4 | + |
| 37 | | + | 144 | E7 | | T4 | 0 | IN37 | | 0 | | 146 | R4 | + |
| 38 | | + | 144 | E8 | | T4 | 0 | IN38 | | 0 | | 146 | R4 | + |
| 39 | | + | 144 | E9 | | T4 | 0 | IN39 | | 0 | | 146 | R4 | + |
| 40 | | + | 144 | E10 | | T5 | 0 | IN40 | | 0 | | 146 | R4 | + |
| 41 | | + | 144 | E1 | | T5 | 0 | IN41 | | 0 | | 146 | R5 | + |
| 42 | | + | 144 | E2 | | T5 | 0 | IN42 | | 0 | | 146 | R5 | + |
| 43 | | + | 144 | E3 | | T5 | 0 | IN43 | | 0 | | 146 | R5 | + |
| 44 | | + | 144 | E4 | | T5 | 0 | IN44 | | 0 | | 146 | R5 | + |
| 45 | | + | 144 | E5 | | T5 | 0 | IN45 | | 0 | | 146 | R5 | + |
| 46 | | + | 144 | E6 | | T5 | 0 | IN46 | | 0 | | 146 | R5 | + |
| 47 | | + | 144 | E7 | | T5 | 0 | IN47 | | 0 | | 146 | R5 | + |
| 48 | | + | 144 | E8 | | T5 | 0 | IN48 | | 0 | | 146 | R5 | + |
| 49 | | + | 144 | E9 | | T5 | 0 | IN49 | | 0 | | 146 | R5 | + |
| 50 | | + | 144 | E10 | | T6 | 0 | IN50 | | 0 | | 146 | R5 | + |
| 51 | | + | 144 | E1 | | T6 | 0 | IN51 | | 0 | | 146 | R6 | + |
| 52 | | + | 144 | E2 | | T6 | 0 | IN52 | | 0 | | 146 | R6 | + |
| 53 | | + | 144 | E3 | | T6 | 0 | IN53 | | 0 | | 146 | R6 | + |
| 54 | | + | 144 | E4 | | T6 | 0 | IN54 | | 0 | | 146 | R6 | + |
| 55 | | + | 144 | E5 | | T6 | 0 | IN55 | | 0 | | 146 | R6 | + |
| 56 | | + | 144 | E6 | | T6 | 0 | IN56 | | 0 | | 146 | R6 | + |
| 57 | | + | 144 | E7 | | T6 | 0 | IN57 | | 0 | | 146 | R6 | + |
| 58 | | + | 144 | E8 | | T6 | 0 | IN58 | | 0 | | 146 | R6 | + |
| 59 | | + | 144 | E9 | | T6 | 0 | IN59 | | 0 | | 146 | R6 | + |
| 60 | | + | 144 | E10 | | T7 | 0 | IN60 | | 0 | | 146 | R6 | + |
| 61 | | + | 144 | E1 | | T7 | 0 | IN61 | | 0 | | 146 | R7 | + |
| 62 | | + | 144 | E2 | | T7 | 0 | IN62 | | 0 | | 146 | R7 | + |
| 63 | | + | 144 | E3 | | T7 | 0 | IN63 | | 0 | | 146 | R7 | + |
| 64 | | + | 144 | E4 | | T7 | 0 | IN64 | | 0 | | 146 | R7 | + |
| 65 | | + | 144 | E5 | | T7 | 0 | IN65 | | 0 | | 146 | R7 | + |
| 66 | | + | 144 | E6 | | T7 | 0 | IN66 | | 0 | | 146 | R7 | + |
| 67 | | + | 144 | E7 | | T7 | 0 | IN67 | | 0 | | 146 | R7 | + |
| 68 | | + | 144 | E8 | | T7 | 0 | IN68 | | 0 | | 146 | R7 | + |
| 69 | | + | 144 | E9 | | T7 | 0 | IN69 | | 0 | | 146 | R7 | + |
| 70 | | + | 144 | E10 | | T8 | 0 | IN70 | | 0 | | 146 | R7 | + |
| 71 | | + | 144 | E1 | | T8 | 0 | IN71 | | 0 | | 146 | R8 | + |
| 72 | | + | 144 | E2 | | T8 | 0 | IN72 | | 0 | | 146 | R8 | + |
| 73 | | + | 144 | E3 | | T8 | 0 | IN73 | | 0 | | 146 | R8 | + |
| 74 | | + | 144 | E4 | | T8 | 0 | IN74 | | 0 | | 146 | R8 | + |
| 75 | | + | 144 | E5 | | T8 | 0 | IN75 | | 0 | | 146 | R8 | + |
| 76 | | + | 144 | E6 | | T8 | 0 | IN76 | | 0 | | 146 | R8 | + |
| 77 | | + | 144 | E7 | | T8 | 0 | IN77 | | 0 | | 146 | R8 | + |
| 78 | | + | 144 | E8 | | T8 | 0 | IN78 | | 0 | | 146 | R8 | + |
| 79 | | + | 144 | E9 | | T8 | 0 | IN79 | | 0 | | 146 | R8 | + |
| 80 | | + | 144 | E10 | | T9 | 0 | IN80 | | 0 | | 146 | R8 | + |
| 81 | | + | 144 | E1 | | T9 | 0 | IN81 | | 0 | | 146 | R9 | + |
| 82 | | + | 144 | E2 | | T9 | 0 | IN82 | | 0 | | 146 | R9 | + |
| 83 | | + | 144 | E3 | | T9 | 0 | IN83 | | 0 | | 146 | R9 | + |
| 84 | | + | 144 | E4 | | T9 | 0 | IN84 | | 0 | | 146 | R9 | + |
| 85 | | + | 144 | E5 | | T9 | 0 | IN85 | | 0 | | 146 | R9 | + |
| 86 | | + | 144 | E6 | | T9 | 0 | IN86 | | 0 | | 146 | R9 | + |
| 87 | | + | 144 | E7 | | T9 | 0 | IN87 | | 0 | | 146 | R9 | + |
| 88 | | + | 144 | E8 | | T9 | 0 | IN88 | | 0 | | 146 | R9 | + |
| 89 | | + | 144 | E9 | | T9 | 0 | IN89 | | 0 | | 146 | R9 | + |
| 90 | | + | 144 | E10 | | T10 | 0 | IN90 | | 0 | | 146 | R9 | + |
| 91 | | + | 144 | E1 | | T10 | 0 | IN91 | | 0 | | 146 | R10 | + |
| 92 | | + | 144 | E2 | | T10 | 0 | IN92 | | 0 | | 146 | R10 | + |
| 93 | | + | 144 | E3 | | T10 | 0 | IN93 | | 0 | | 146 | R10 | + |

TABLE-continued

| Pin | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Function | | $S_2$ | $J_1$ | $J_2$ | $J_3$ | $Q_2$ | $\phi$ | $Q_1$ | $K_1$ | $K_2$ | $K_3$ | T | $S_1$ | P |
| 94 | | + | 144 | E4 | | T10 | 0 | 1N94 | | 0 | | 146 | R10 | + |
| 95 | | + | 144 | E5 | | T10 | 0 | 1N95 | | 0 | | 146 | R10 | + |
| 96 | | + | 144 | E6 | | T10 | 0 | 1N96 | | 0 | | 146 | R10 | + |
| 97 | | + | 144 | E7 | | T10 | 0 | 1N97 | | 0 | | 146 | R10 | + |
| 98 | | + | 144 | E8 | | T10 | 0 | 1N98 | | 0 | | 146 | R10 | + |
| 99 | | + | 144 | E9 | | T10 | 0 | 1N99 | | 0 | | 146 | R10 | + |

We claim:

1. A device for recording a two-dimensional image pattern which comprises:

a. means for producing [an electric image signal] *a collection of electrical signals in sequence* which is representative of an image pattern to be recorded, [said electric image signal being composed of] *from which* a plurality of line electrical signals in sequence [may be] *are derived* and each such line signal being composed of a plurality of elementary image electrical signals in sequence, b. recording member composed of a plurality of separate signal-tracing electrodes arranged in spaced relation to each other in one direction, c. means for *stepwise* transporting a recording material capable of being electrostatically charged along said electrodes *said transporting means comprising a step motor adapted to rotate through a discrete arc of predetermined extent during each step and to thereby advance said recording material a discrete linear distance proportionate to said arc extent,* in a direction normal to the direction of spacing of said electrodes, d. plural amplifier circuit means each having the output thereof connected to a corresponding signal-tracing electrode and operative on receiving an elementary image signal at their input to raise the potential of such electrode to a value sufficient to deposit an electrostatic charge on the recording material, e. plural electric storage circuit means associated with said amplifier circuit means for maintaining the input of each associated amplifier means at an electric potential corresponding with that of a particular elementary image signal for a period of time which is at least equal to the period of one line signal, *whereby each operative electrode retains an electrostatic charge for a period of time at least equal to the period of one line signal,* f. plural gate circuit means connecting the elementary image signals of one line signal one by one in sequence to said associated amplifier and electric storage circuit means, g. means for closing said gate circuit means in timed relation with the sequence of the elementary image signals of one line signal, h. means for removing the stored electric signals from the storage circuit means and the potential from said electrodes prior to the recording of an elementary image signal which belongs to another line signal, i. *synchronizing* means responsive to the sequence of the line signals to control the *stepwise* transportation of the recording material at a rate proportional with the succession of the line signals of the image signal, *said synchronizing means activating said step motor to advance said recording material to effect deposition of said charges of each line signal thereon while the material is moving said discrete linear distance,* and j. means for developing the electrostatic image thus formed on the recording material.

2. A device according to claim 1 wherein each electric storage circuit means is controlled to store an elementary image signal during a lapse of time which is comprised between a line period and [half an image period.] *the period of one of one of said collections of electrical signals in sequence.*

3. Device according to claim 1, including an amplification electrode which runs closely parallel to the recording member at its upstream side relative to the direction of movement of the recording material is connected to a potential of a polarity opposite to that of said signal-tracing electrodes.

4. Device according to claim 1, wherein said means for closing said gate circuit means in timed relation comprises a shift register.

5. Device according to claim 1, wherein said signal-tracing electrodes are in the form of needle-like conductors, the extremities of which facing the recording material are arranged in a line.

6. Device according to claim 1, wherein the said signal-tracing electrodes mechanically contact the recording material.

7. Device according to claim 1, including a backing electrode which runs parallel to the recording member at the rear side of the recording material and is connected to a potential of a polarity opposite to that of said signal-tracing electrodes.

* * * * *

UNITED STATES PATENT OFFICE

CERTIFICATE OF CORRECTION

Patent No. Reissue 29,998 Dated May 15, 1979

Inventor(s) Francois Paul Pietermaat et al

It is certified that error appears in the above-identified patent and that said Letters Patent are hereby corrected as shown below:

In the Claims:

Claim 1, subparagraph c, the lengthy italicized insertion should follow the comma at the end of subparagraph c rather than interposed in the middle of subparagraph c where its presence obviously garbles the meaning of that subparagraph.

Signed and Sealed this

*Thirteenth* Day of *January 1981*

[SEAL]

*Attest:*

SIDNEY A. DIAMOND

*Attesting Officer*

*Commissioner of Patents and Trademarks*